United States Patent
Luo et al.

(10) Patent No.: US 7,873,060 B2
(45) Date of Patent: Jan. 18, 2011

(54) ACCELERATING DATA COMMUNICATION USING TUNNELS

(75) Inventors: Wenping Luo, Richmond (CA); Hongwei Li, Burnaby (CA); Yixin Pan, Burnaby (CA); Tao Huang, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 18 days.

(21) Appl. No.: 12/253,974

(22) Filed: Oct. 18, 2008

(65) Prior Publication Data

US 2010/0098092 A1 Apr. 22, 2010

(51) Int. Cl.
*H04L 12/56* (2006.01)
*G06F 15/16* (2006.01)

(52) U.S. Cl. ...................... 370/401; 709/233
(58) Field of Classification Search ........................ None
See application file for complete search history.

(56) References Cited

U.S. PATENT DOCUMENTS

| | | | |
|---|---|---|---|
| 7,027,400 B2* | 4/2006 | O'Neill | 370/235 |
| 7,310,356 B2* | 12/2007 | Abdo et al. | 370/522 |
| 7,339,929 B2* | 3/2008 | Zelig et al. | 370/390 |
| 7,533,410 B1* | 5/2009 | Fung et al. | 726/15 |
| 7,542,476 B2* | 6/2009 | Almog et al. | 370/401 |
| 7,609,701 B2* | 10/2009 | Yang et al. | 370/395.52 |
| 7,653,075 B2* | 1/2010 | Singh et al. | 370/401 |
| 7,778,176 B2* | 8/2010 | Morford | 370/231 |
| 7,823,155 B2* | 10/2010 | Misra et al. | 718/104 |
| 2002/0156901 A1* | 10/2002 | Erickson et al. | 709/227 |
| 2005/0013295 A1* | 1/2005 | Regan et al. | 370/389 |
| 2006/0140161 A1* | 6/2006 | Stephens et al. | 370/338 |
| 2007/0008878 A1* | 1/2007 | Filsfils et al. | 370/216 |
| 2007/0058639 A1* | 3/2007 | Khan | 370/395.52 |
| 2007/0110072 A1* | 5/2007 | Elias | 370/395.5 |
| 2007/0268878 A1* | 11/2007 | Clements | 370/338 |
| 2008/0130515 A1* | 6/2008 | Vasseur | 370/254 |
| 2009/0092137 A1* | 4/2009 | Haigh et al. | 370/392 |
| 2009/0210427 A1* | 8/2009 | Eidler et al. | 707/10 |
| 2010/0115604 A1* | 5/2010 | Gerber et al. | 726/15 |

* cited by examiner

*Primary Examiner*—Gregory B Sefcheck
(74) *Attorney, Agent, or Firm*—Hamilton, DeSanctis & Cha LLP

(57) ABSTRACT

Methods and systems are provided for increasing application performance and accelerating data communications in a WAN environment. According to one embodiment, a method is provided for securely accelerating network traffic. One or more tunnels are established between a first wide area network (WAN) acceleration device, interposed between a public network and a first local area network (LAN), and a second WAN acceleration device, interposed between a second LAN and the public network. Thereafter, network traffic exchanged between the first LAN and the second LAN is securely accelerated by (i) multiplexing multiple data communication sessions between the first LAN and the second LAN onto the one or more tunnels, (ii) performing one or more of application acceleration, transport acceleration and network acceleration on the data communication sessions and (iii) performing one or more security functions on the data communication sessions.

14 Claims, 10 Drawing Sheets

ACCELERATING DATA COMMUNICATION USING TUNNELS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2008, Fortinet, Inc.

BACKGROUND

1. Field

Embodiments of the present invention generally relate to acceleration of data communications. In particular, embodiments of the present invention relate to use of connection-oriented and/or connectionless tunnels between edge traffic acceleration devices to apply application acceleration, transport acceleration and/or network acceleration on data streams based on a classification of the data streams to achieve wide-area data services (WDS).

2. Description of the Related Art

Corporate networks are facing significant problems in relation to application performance and moving content across their wide area networks (WANs). WAN performance issues are primarily a result of application protocol overhead and latency, Transport Control Protocol (TCP) overhead and latency and limited WAN bandwidth. Additionally, some application-level protocols make small request/response interactions, which work fine in a local area network (LAN) environment, but which perform poorly in a WAN environment.

Thus, there is a need in the art for improved WAN acceleration solutions.

SUMMARY

Methods and systems are described for increasing application performance and accelerating data communications in a WAN environment. According to one embodiment, a method is provided for securely accelerating network traffic. One or more tunnels are established between a first wide area network (WAN) acceleration device, interposed between a public network and a first local area network (LAN), and a second WAN acceleration device, interposed between a second LAN and the public network. Thereafter, network traffic exchanged between the first LAN and the second LAN is securely accelerated by (i) multiplexing multiple data communication sessions between the first LAN and the second LAN onto the one or more tunnels, (ii) performing one or more of application acceleration, transport acceleration and network acceleration on the multiple data communication sessions and (iii) performing one or more security functions on the multiple data communication sessions.

In the aforementioned embodiment, the first WAN acceleration device may be a logical device running within a client system on the first LAN.

In various instances of the aforementioned embodiments, the second WAN acceleration device may be a logical device running within a client system on the second LAN.

In the context of various of the aforementioned embodiments, the one or more tunnels may include a connection-oriented tunnel.

In some cases, the one or more tunnels may include a connectionless tunnel.

In various instances of the aforementioned embodiments, the one or more tunnels may include one or more private tunnels.

In the context of various of the aforementioned embodiments, the establishment of tunnels may involve automatically establishing the one or more tunnels responsive to either the first WAN acceleration device or the second WAN acceleration device recognizing the other as a peer WAN acceleration device.

In some instances, the establishment of tunnels may involve establishing the one or more tunnels after determining that one or more of the multiple data communication sessions would benefit as a result.

In the context of various of the aforementioned embodiments, application acceleration may be performed by one or more application proxies implemented within the first WAN acceleration device and the second WAN acceleration device.

In various instances of the aforementioned embodiments, transport acceleration involves techniques used to improve performance of Transport Control Protocol (TCP) across high latency or high loss links including one or more of TCP connection pooling, TCP window scaling, selective acknowledgement (SACK), round-trip measurement and High-Speed TCP.

In some cases, network acceleration involves packet-level bandwidth reduction techniques including one or more of data reduction, data compression and packet coalescing.

In the context of various of the aforementioned embodiments, the one or more security functions may include one or more of antivirus scanning, web filtering, spam detection, firewalling and intrusion prevention.

Other embodiments of the present invention provide a program storage device readable by one or more processors of a network device, tangibly embodying a program of instructions executable by the one or more processors to perform method steps for securely accelerating wide area network (WAN) traffic. The method steps include establishing one or more tunnels between the network device and a peer WAN acceleration device through a WAN coupling the network device and the peer WAN acceleration device in communication. And, securely accelerating network traffic exchanged between the network device and the peer WAN device by (i) multiplexing multiple data communication sessions between the network device and the peer WAN device onto the one or more tunnels, (ii) performing one or more of application acceleration, transport acceleration and network acceleration on the multiple data communication sessions and (iii) performing one or more security functions on the multiple data communication sessions.

In the aforementioned embodiment, the network device may be a client system, a network security appliance or a gateway.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
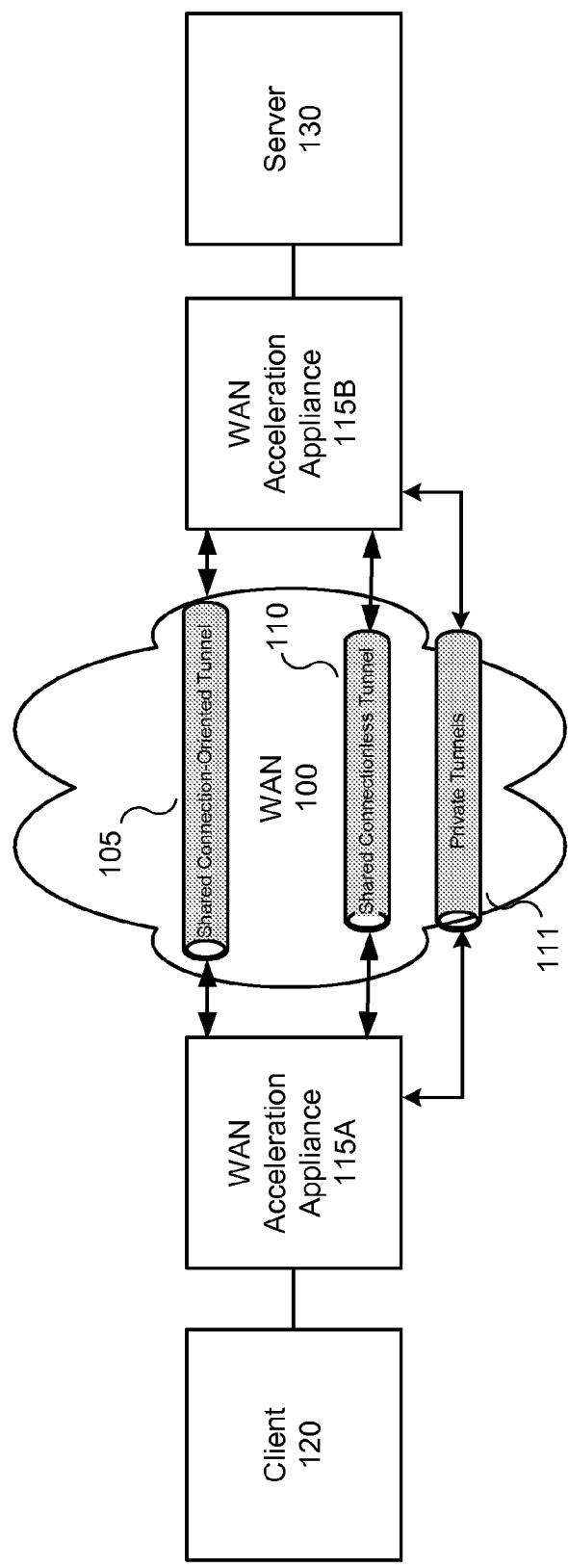
FIG. 1 is a block diagram conceptually illustrating a simplified network topology in which embodiments of the present invention may be employed.

Methods and systems are described for increasing application performance and accelerating data communications in a WAN environment. According to one embodiment, three kinds of traffic optimizations, including application acceleration, transport acceleration and network acceleration, may be employed on data communications sessions between local area network (LAN) segments coupled through a WAN. The traffic optimizations may work independently or in conjunction with one another depending on the characteristics and workload of the traffic sent across the network. In contrast to existing WAN acceleration solutions, embodiments of the present invention (i) seek to achieve improved data reduction results by multiplexing multiple data communication sessions over shared connection-oriented and/or connectionless tunnels established between peer WAN acceleration devices and (ii) additionally provide network security functionality and/or application security integration, such as anti-virus scanning, Web filtering, spam detection and the like, which typically requires a separate device.

While, for sake of illustration, various embodiments of the present invention are discussed in the context of WAN acceleration appliances, it is to be understood that embodiments of the present invention may be implemented and deployed in the context of a variety of other virtual or physical network devices or appliances that may be logically interposed between LAN segments and public networks, such as network gateways, network security appliances, virtual private network (VPN) gateways and the like. Additionally, it is to be understood that the WAN acceleration solution described herein may also be run on the same computer system as the application client as a software agent, for example, thereby allowing remote users, for example, to exchange data with a data center in an accelerated manner. An example of an existing security agent into which the WAN acceleration functionality describe herein may be incorporated include the FortiClient™ family of end point security solutions available from Fortinet, Inc. of Sunnyvale, Calif. Consequently, in one embodiment, WAN acceleration can be provided within an application security integration model.

Similarly, while for sake of brevity, embodiments of the present invention are described with respect to Server Message Block (SMB)/Common Internet File System (CIFS), the methods and systems described herein are equally applicable to other remote file-system access protocols, such as Samba, Network File System (NFS) Not Quite NFS (NQNFS), Optimized Remote File-system Access (ORFA), Apple Filing Protocol (AFP), NetWare Core Protocol (NCP), Kerberos, Remote File System (RFS), OS/400 File Server file system (QFileSvr.400).

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms used throughout this application are given below.

The phrase "CIFS read-ahead" generally refers to a technique used to pipeline read operations. For example, when a user is working with a file, acceleration devices can generate read ahead requests within the file in order to pipeline operations to the server, thus eliminating the round-trip delay associated with waiting for acknowledgement. This minimizes the latency associated with read operations.

The phrase "CIFS write-behind" generally refers to a technique used to pipeline write operations. For example, acceleration appliances can pipeline write operations on behalf of a client, thus eliminating round-trip delays associating with waiting for acknowledgements. This minimizes the amount of round trips required to perform write operations, improving performance without risking data integrity.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an email client.

"Common Internet File System" or the acronym "CIFS" generally refers to a protocol developed by Microsoft for remote file access. CIFS, which is based on the Simple Message Block (SMB) protocol, allows most applications to open and share files across the Internet or other Internet Protocol (IP) based networks. Some specific capabilities of CIFS include file access, record locking, read/write privileges, change notification, server name resolution, request batching, and server authentication. CIFS is a fairly "chatty" protocol, requiring hundreds, or even thousands, of round trips to successfully transfer a single file. This is typically not an issue when file servers are deployed on the same Local Area Network (LAN) as clients. However, when CIFS is used across a Wide Area Network (WAN), as is the case when branch offices are accessing file servers located within a centralized data center, both latency and bandwidth constraints across the WAN can adversely impact file sharing performance.

The terms "connected" or "coupled" and related terms are used in an operational sense and are not necessarily limited to a direct connection or coupling.

The phrase "connection pooling" generally refers to a technique to maintain a pool of open connections to reduce the overhead associated with opening a new connection. In embodiments of the present invention, when a client makes a request that requires new a TCP connection, an already opened connection can be used. Many of TCP connections are short-lived, yet each requires significant overhead to initiate communications. Such short-lived connections can result in significant reductions in application speeds. For example, loading a single ordinary Web page can require a client to open 10 or more TCP connections.

The phrase "data compression" generally refers to techniques that are used to reduce the amount of data stored or transmitted. In one embodiment, data compression is used to reduce the bandwidth consumed by traffic traversing a WAN. "Payload" compression uses algorithms to identify relatively short byte sequences that are repeated frequently over time. These sequences may then be replaced with shorter segments of code to reduce the size of transmitted data. Sophisticated algorithms can find duplication across packets and even across flows, e.g., dictionary based compression. "Header" compression can provide additional bandwidth gains by reducing packet header information using specialized compression algorithms.

The phrase "data reduction" generally refers to technology that can be used to recognize repetitive information and deliver in place of the repetitive information a reference thereto. For example, repetitive information may be replaced in a data stream with its reference from local data stores (as opposed to re-sending it across the WAN) in real-time. By preventing repetitive information from traversing the WAN, empirical evidence suggests data reduction can save over 90% of WAN bandwidth. By delivering information from local data stores, data reduction helps to provide LAN-like performance across the WAN.

The phrase "forward error correction" or the acronym "FEC" generally refers to a packet loss mitigation technology used to improve application performance across WANs that have high loss characteristics. FEC technology adapted to operate on packets at the network-layer is modeled after a similarly named loss mitigation technology that is well known for its ability to correct bit errors at the physical-layer. According to one embodiment, FEC is applied by adding an additional error recovery packet for every "N" packets that are sent across the WAN. This FEC packet contains information that can be used to reconstruct any single packet within the group of N. If one of these N packets happens to be lost during transfer across the WAN, the FEC packet is used on the far end of the WAN link to reconstitute the lost packet. This eliminates the need to retransmit the lost packet across the WAN, which dramatically reduces application response time and improves WAN efficiency. In some embodiments, FEC overhead can be dynamically adjusted in response to changing link conditions for maximum effectiveness in environments with high packet loss. Packet-level FEC avoids delays that come with multiple-round-trip retransmissions. This enables WANs to easily recover from packet loss due to a variety of network layer conditions, such as queue overflows and constrained bandwidth links. With packet level FEC, enterprises commonly see significant improvements in application performance—up to a ten-fold performance increase in some WAN environments.

The phrase "High-Speed TCP" generally refers to a modification to TCP's congestion control mechanism for use with TCP connections with large congestion windows. TCP performance starts to degrade beyond 100M bits/sec due to its window-adjustment algorithm. In its congestion-avoidance phase, ordinary TCP increases its sending window by one packet every round-trip time. When TCP detects congestion, it cuts the window in half. For a high-bandwidth, high-latency connection, this can result in several hundred seconds of latency. High-Speed TCP alters how the window is opened on each round trip and closed on congestion events as a function of the absolute size of the window. When the window is small, High-Speed TCP behaves exactly like ordinary TCP. But, when the window is large, High-Speed TCP increases the window by a larger amount and decreases it by a smaller amount, where these amounts are chosen based on the precise value of the window in operation. The effect of these changes is that TCP achieves high throughput with more realistic requirements for packet drop rates. Similarly, High-Speed TCP has more realistic requirements for the number of round-trip times between loss events.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "network gateway" generally refers to an internetworking system, a system that joins two networks together. A "network gateway" can be implemented completely in software, completely in hardware, or as a combination of the two. Depending on the particular implementation, network gateways can operate at any level of the OSI model from application protocols to low-level signaling.

If the specification states a component or feature "may", "can", "could", or "might" be included or have a characteristic, that particular component or feature is not required to be included or have the characteristic.

The phrase "packet coalescing" generally refers to the concept of combining multiple packets traveling between two common points into a single coalesced packet. Used in conjunction with header compression, this amortizes a single header over multiple packets thus decreasing overhead, and therefore bandwidth requirements. Packet coalescing is thought to be particularly beneficial for Web applications, Voice over Internet Protocol (VoIP), and interactive applications. Packet coalescing also reduces the number packets traversing the WAN and hence the overall latency for those packets. More packets require more CPU power to process the packets at each device along the path of the WAN assuming the bandwidth remains constant.

The term "responsive" includes completely or partially responsive.

The phrase "round-trip measurement" generally refers to a TCP mechanism to use the TCP round trip time measurement option to calculate round-trip time (RTT) accurately and efficiently. TCP implements reliable data delivery by retransmitting segments that are not acknowledged within some retransmission timeout (RTO) intervals. Accurate dynamic determination of an appropriate RTO is essential to TCP performance. When the option is used, rather than using a single sample per window, a timestamp is placed on all packets (including retransmissions). This leads to be more accurate RTO behavior with negligible computational cost.

The phrase "selective acknowledgement" and the acronym "SACK" generally refer to a TCP mechanism to use the TCP selective acknowledgement option. In one embodiment, SACK gives the sender a complete picture of which segments are queued at the receiver and which have not yet arrived. Fast retransmit and fast recovery algorithms have been created to recover TCP from packet loss by providing a mechanism to retransmit unacknowledged packets. Without selective acknowledge, these algorithms may spend a large amount of bandwidth to retransmit packets in environments where more than one packet is lost per window, which often happens in long WAN links (with high latency).

The term "server" generally refers to an application, program, process or device in a client/server relationship that responds to requests for information or services by another program, process or device (a server) on a network. The term "server" also encompasses software that makes the act of serving information or providing services possible. The term "server" also encompasses software that makes the act of serving information or providing services possible.

The phrase "TCP acceleration" generally refers to techniques used to improve the performance of TCP across high latency (and loss) links, including, but not limited to TCP window scaling, selective acknowledgements (SACK), Round-Trip Measurement and High-Speed TCP.

The phases "TCP window scaling" and "window scaling" generally refer to a technique using the window scale TCP option to adjust the window size value found in a TCP header. Notably, window sizes as large as 1 GB can be obtained. The TCP window determines how much data can be transferred before the end-system stops and waits for acknowledgements of received packets. The TCP header uses a 16-bit field to report the receive window size to the sender, which creates static window sizes that are limited to 65,535 bytes. If the TCP window is lower than the product of the latency and available bandwidth, clients cannot send acknowledgements back fast enough. To address the above problem, embodiments of the present invention adjust the TCP window to be large enough to fit the maximum available bandwidth times the maximum anticipated delay.

The phrase "Web Cache Communications Protocol" or the acronym "WCCP" generally refer to a protocol that specifies interactions between one or more routers, acceleration appliances, and/or caches. The purpose of the interaction is to establish and maintain the transparent redirection of selected types of traffic flowing through a group of devices, optimizing resource usage and lowering response times.

FIG. 1 is a block diagram conceptually illustrating a simplified network topology in which embodiments of the present invention may be employed. In this simplified illustration, a client 120 communicates with a server 130 through a WAN 100 via a client-side WAN acceleration appliance 115A and a server-side WAN acceleration appliance 115B. WAN 100 may include one or more public networks, such as the Internet, common-carrier lines, satellites and/or private networks.

At least one distinctive feature of various embodiments of the present invention is the use of one or more shared tunnels, such as a shared connection-oriented tunnel 105 and a shared connectionless tunnel 110. As described further below, peer WAN acceleration appliances 115A and 115B may form one or more tunnels between each other, including, but not limited to, shared connection-oriented tunnel 105, shared connectionless tunnel 110 and one or more private tunnels 111, to facilitate WAN acceleration processing.

In a network environment (e.g., a corporate enterprise network) in which two subnets (LANs) can reach each other through a WAN, embodiments of the present invention include building (in automatic mode or on-demand mode) one or both of connection-oriented and connectionless tunnels between peer WAN acceleration appliances 115A and 115B that run on the edge between respective LAN segments and the WAN 100. In some embodiments, multiple data communication sessions may share the same tunnel between WAN acceleration appliances 115A and 115B. As described in more detail below, such sharing of the same tunnel can create efficiencies in the context of various data reduction techniques.

In some embodiments, one or both of WAN acceleration appliances 115A and 115B are implemented and integrated within a secure gateway or network security platform, which also performs various security functions, including, but not limited to antivirus scanning, web filtering, spam detection, firewalling, intrusion detection and prevention and virtual private network (VPN) services. Examples of existing systems into which the WAN acceleration functionality describe herein may be incorporated include the FortiGate™ family of network security platforms available from Fortinet, Inc. of Sunnyvale, Calif. Alternatively, one or both of WAN acceleration appliances 115A and 115B may be standalone acceleration devices without integrated network security functions.

Figure 2:
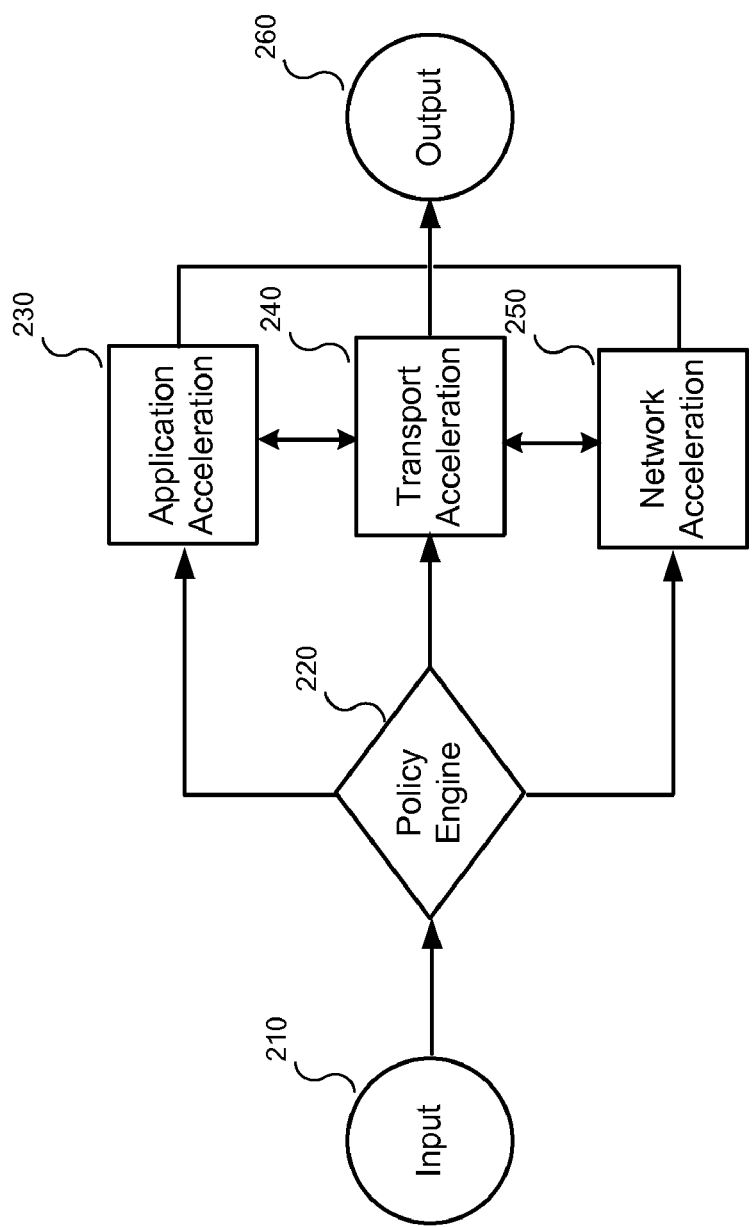
FIG. 2 is a block diagram conceptually illustrating an abstract architecture of WAN acceleration functionality according to various embodiments of the present invention.

FIG. 2 is a block diagram conceptually illustrating an abstract architecture of WAN acceleration functionality according to various embodiments of the present invention. According to the present example, input 210 (e.g., a packet originated by a client or server that is part of a traffic flow or session) is initially received by a policy engine 220 of the WAN acceleration appliance (e.g., WAN acceleration appliance 115A or 115B). Policy engine 220 implements functionality that classifies a specific traffic flow or session to a matching policy and decides how to accelerate the traffic over the WAN (e.g., WAN 100). In one embodiment, a portion of the policy engine 220 is implemented in kernel so that traffic that is not a candidate for WAN acceleration can simply be forwarded directly through without acceleration. As described further below, if the traffic is to be accelerated in the transport or application layer, then the kernel may redirect the traffic to the application layer for further processing. In some embodiments, various application processes may implement part of the functionalities of the policy engine 220 in order to achieve the desired level of granularity of policy control.

In the depicted embodiment, there are three kinds of traffic optimizations that can be performed over the WAN, application acceleration 210, transport acceleration 240 and network acceleration 250. Depending upon the particular implementation, one or more of these traffic optimizations may be employed. According to one embodiment, application acceleration 230 implements a series of application proxies (not shown) for WAN protocols that are desired to be accelerated. These application proxies may represent important (but poorly behaved over WAN) protocols that can be accelerated through transaction prediction and pre-population features, such as Web object prefetching, CIFS read-ahead and write-behind, for example. In one embodiment, the application proxies are adapted to identify relatively stable data blocks, such as file, image, web page and the like, while being aware of interactive state so that they can do a better job by applying proper data reduction, data compression and Quality of Service (QoS) for different protocol data.

Transport acceleration 240 may implement functionality to improve the performance of transport protocols (e.g., TCP) across high latency and high loss links. Transport acceleration 240 may also implement TCP connection pooling for short-life TCP connections as well as a generic TCP proxy.

Network acceleration 250 may implement functionalities to reduce bandwidth usage over the WAN and to improve WAN performance at the packet level by using data reduction, data compression, packet coalescing and the like. QoS and traffic shaping may also be implemented within network acceleration 250.

In a simple implementation, the foregoing functionality may be mainly implemented in the application layer on a single-processor system. In a more complex implementation, large amounts of parallelism can be introduced by running different parts of the abstract functionality described above in the kernel with multiple central processing units on different hardware functional units. Depending upon the characteristics and workload of the data sent across the network and the particular implementation, the traffic optimizations may work independently or in conjunction with one another.

Figure 3:
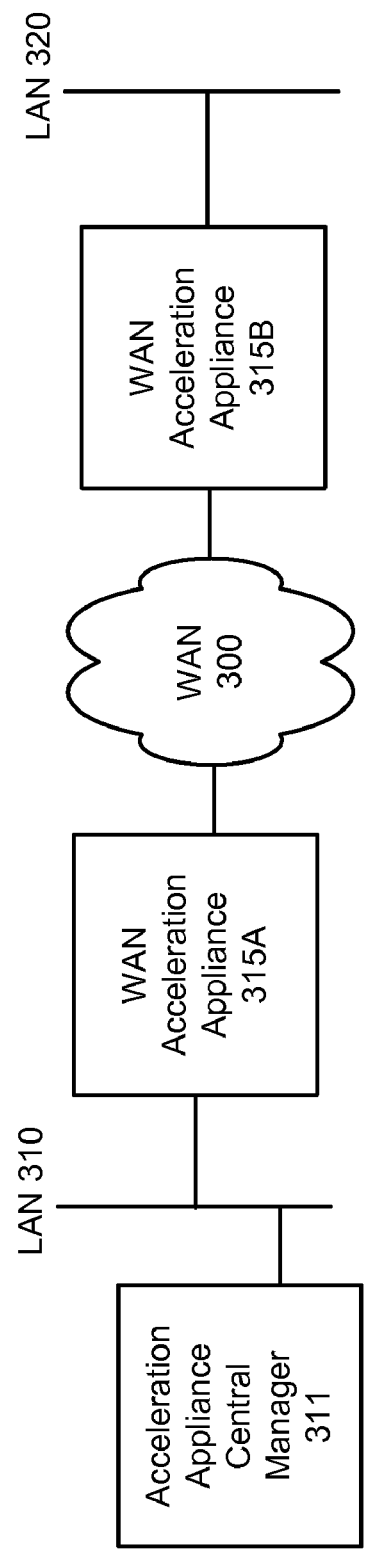
FIG. 3 illustrates an in-path mode deployment scenario for WAN acceleration appliances in accordance with embodiments of the present invention.

FIG. 3 illustrates an in-path mode deployment scenario for WAN acceleration appliances 315A and 315B in accordance with embodiments of the present invention. According to the exemplary network topology depicted in the present example, two LAN segments, LAN 310 and LAN 320 are communicatively coupled to each other via WAN acceleration appliances 315A and 315B that are in the direct path between clients and servers (not shown) on the LAN segments. Such a deployment topology is generally suitable for locations where the total bandwidth is within the limits of the WAN acceleration appliances 315A and 315B.

In the present example, an acceleration appliance central manager 311 is shown coupled to LAN 310. In various embodiments of the present invention, the acceleration appliance central manager 311 provides for centrally managing, monitoring and configuring of multiple WAN acceleration appliances that may be distributed throughout an enterprise.

According to one embodiment, acceleration appliance central manager 311 provides visibility to a network administrator, for example, regarding how applications are performing over the WAN. For example, detailed information about traffic patterns, bandwidth consumption and other performance trends may be provided to IT personnel to allow WAN resources to be used more effectively. In one embodiment, acceleration appliance central manager 311 is capable of reporting, among other things, bandwidth consumption, top talkers and how QoS policies are impacting overall application throughput. Examples of existing systems into which the above-described acceleration appliance central management functionality may be incorporated include the FortiManager™ family of centralized management appliances available from Fortinet, Inc. of Sunnyvale, Calif.

Figure 4:
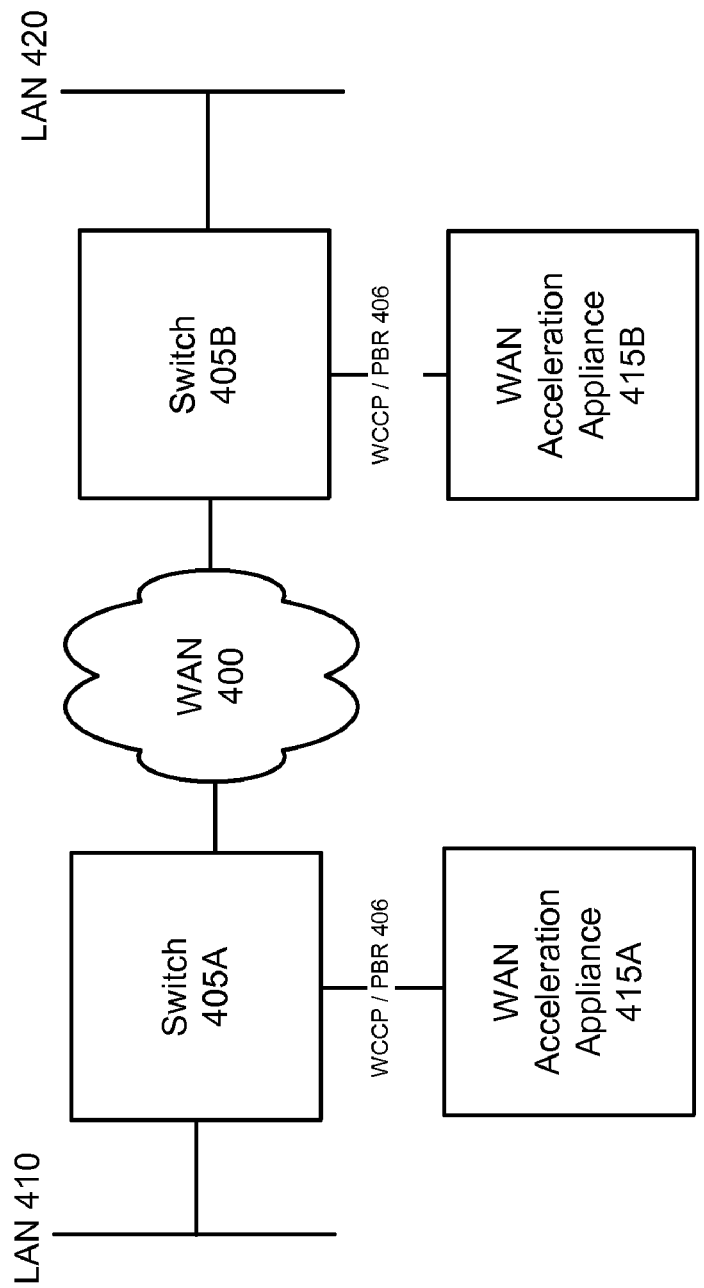
FIG. 4 illustrates a redirection mode deployment scenario for WAN acceleration appliances in accordance with embodiments of the present invention.

FIG. 4 illustrates a redirection mode deployment scenario for WAN acceleration appliances 415A and 415B in accordance with embodiments of the present invention. According to the exemplary network topology depicted in the present example, two LAN segments, LAN 410 and LAN 420 are communicatively coupled to each other via switches 405A and 405B. In such a redirection deployment, the WAN acceleration appliances 415A and 415B are not in the direct path between clients and servers (not shown) on the LAN segments. Rather, the WAN acceleration appliances 415A and 415B are coupled to switches 405A and 405B, respectively, via WCCP/PBR links 406A and 406B, respectively. Such a deployment topology uses a packet redirection mechanism to direct packets to WAN acceleration appliances 415A and 415B from switches 405A and 405B, respectively. Exemplary redirection mechanisms include, but are not limited to, Web Cache Communication Protocol (WCCP) and policy-based routing (PBR).

WWCP version 2 can be used, for example, to redirect any type of connection from multiple routers to multiple Web caches. A central concept of WCCP is a service group, which, in accordance with one embodiment, logically consists of the router, e.g., the switch 405A, 405B or router and the corresponding WAN acceleration appliance 415A, 415B that work together to redirect and optimize traffic. Using WWCP in accordance with an embodiment of the present invention, a WAN accelerator appliance 415A, 415B may optimize traffic by (i) adding the corresponding switch 405A, 405B or router and the WAN accelerator appliance 415A, 415B to the same service group, (ii) the WAN accelerator appliance 415A, 415B announcing itself to the corresponding switch 405A, 405B or router, (iii) the switch 405A, 405B then responds with the state of the service group and (iv) the WAN accelerator appliance 415A, 415B instructs the switch 405A, 405B or the router how to redirect traffic.

PBR is a router configuration that allows policies to be defined to route packets instead of relying on routing protocols. PBR can be enabled on an interface basis. Thereafter, packets arriving on a PBR-enabled interface are checked to see if they match the defined policies. If the packet matches, then it is routed according to the rule defined for the policy (e.g., the packet is redirected to a specified Internet Protocol (IP) address, such as the IP address of the associated WAN accelerator appliance 415A, 415B). If the packet does not match, it is routed based on the usual routing table.

Figure 5:
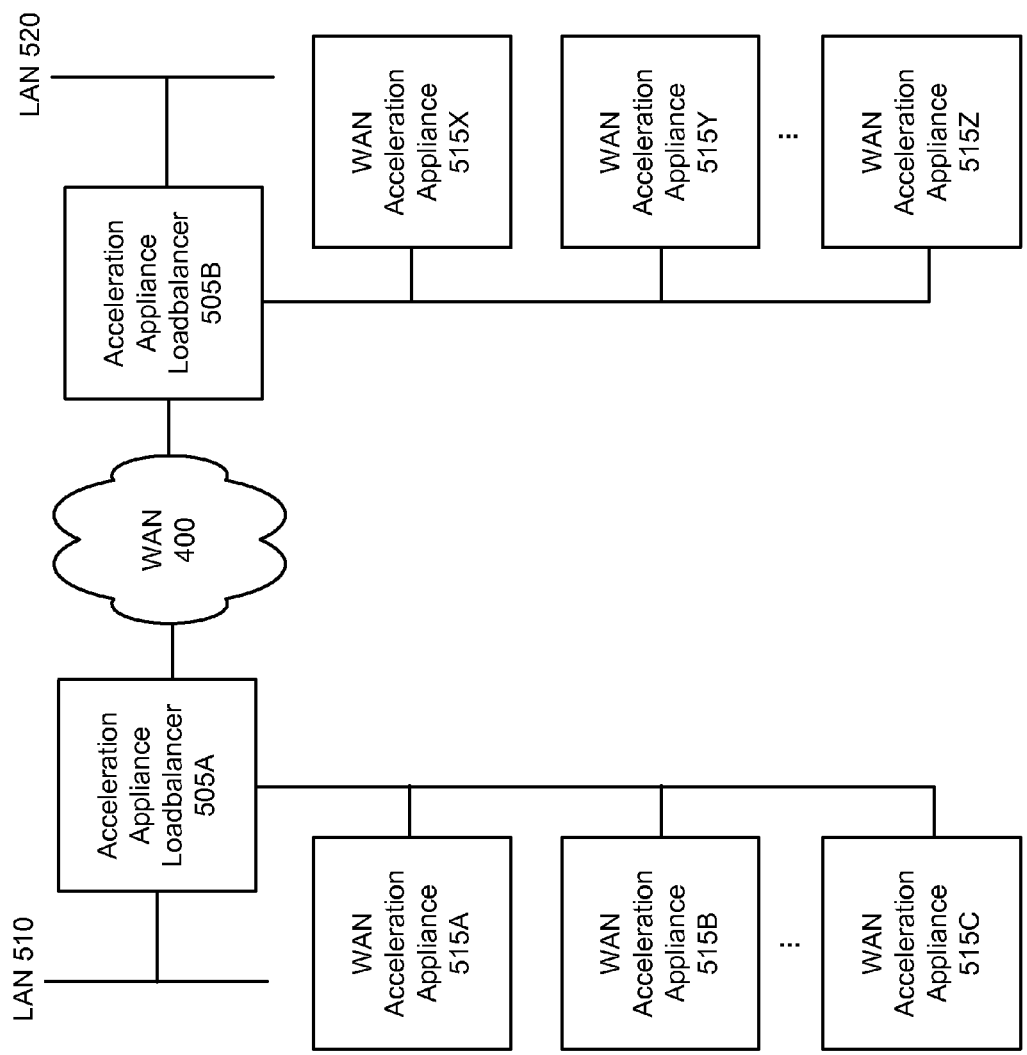
FIG. 5 illustrates a loadbalancer mode deployment scenario for WAN acceleration appliances in accordance with embodiments of the present invention.

FIG. 5 illustrates a loadbalancer mode deployment scenario for WAN acceleration appliances 515A, 515B, 515C and 515X, 515Y, 515Z in accordance with embodiments of the present invention. According to the exemplary network topology depicted in the present example, two LAN segments, LAN 510 and LAN 520 are communicatively coupled to each other via acceleration appliance loadbalancers 505A and 505B. In such a loadbalancer deployment, the acceleration appliance loadbalancers 505A and 505B may automatically balance load among the corresponding pool of WAN acceleration appliances 515A, 515B, 515C and 515X, 515Y, 515Z, respectively, according to a configurable set of rules.

According to one embodiment, acceleration appliance loadbalancers 505A and 505B monitor the capacity of the individual WAN acceleration appliances of the corresponding pool of WAN acceleration appliances to process new connections. In one embodiment, when load-balancing rules are configured, a target list of WAN acceleration appliances may be specified in each rule. Connections that match the rule may be redirected to the WAN acceleration appliances in the list. If no rules match, the connections are balanced among those of the WAN acceleration appliances in the corresponding pool of WAN acceleration appliances that are capable of processing new connections; otherwise, the connection at issue can simply be passed through the network without optimization.

It should be understood that while in the context of FIG. 3, FIG. 4, and FIG. 5 only a single deployment mode is illustrated within a particular figure, deployment modes may be mixed and matched as desired. For example, one corporate site may employ a redirection deployment, another may use an in-path mode and yet another may have WAN accelerator appliances deployed in a loadbalancer mode.

Additionally, in some embodiments, redundancy may additionally be employed concurrently with the above-referenced deployment modes to ensure optimization continues even in the face of a failure on the part of one of a set of redundant WAN accelerator appliances. For example, redundant WAN accelerator appliances may operate in one of two modes, an active-passive mode and an active-active mode. In the active-passive mode, if the master WAN accelerator appliance fails, the backup WAN accelerator appliance takes over and starts processing all the connections. In the active-active mode, one or more other backup WAN accelerator appliances are warmed and able to seamlessly proceed with optimization should the master WAN accelerator appliance fail. In one embodiment, data cache synchronization may be configured among a group of WAN accelerator appliances to provide for automatic synchronization and replication.

Figure 6:
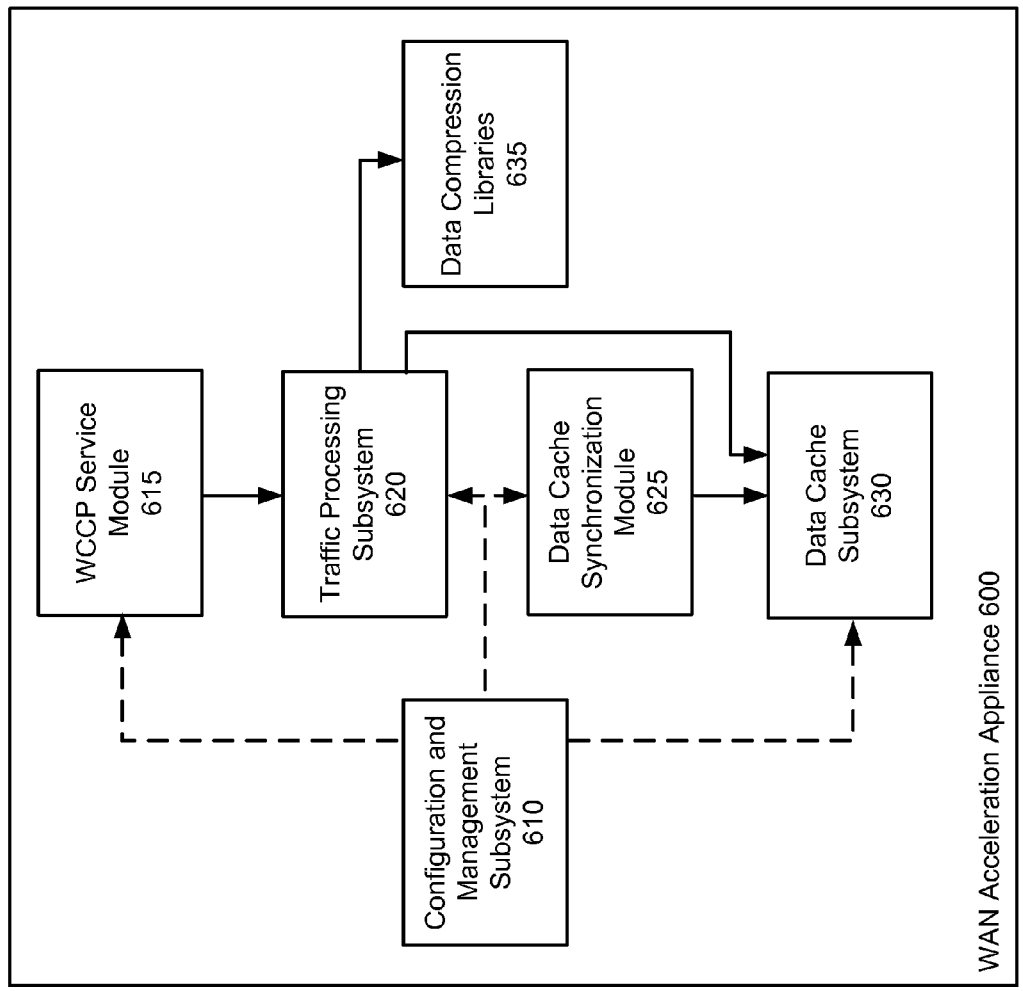
FIG. 6 is a block diagram conceptually illustrating interaction among various functional units of a WAN acceleration appliance in accordance with one embodiment of the present invention.

FIG. 6 is a block diagram conceptually illustrating interaction among various functional units of a WAN acceleration appliance in accordance with one embodiment of the present invention. In the present example, WAN acceleration appliance 600 includes six interacting functional units, a configuration and management subsystem 610, a WCCP service module 615, a traffic processing subsystem 620, a data cache synchronization module 625, a data cache subsystem 630 and data compression libraries.

According to one embodiment, configuration and management subsystem 610 implements one or more of a command-line interface (CLI), a graphical user interface (GUI) and a remote management interface (RMI). The RMI interface may be used by an acceleration appliance central manager (e.g., acceleration appliance central manager 311) to receive user configuration and appropriately direct the other functional units. Configuration and management subsystem 610 may also provide service to synchronize configuration in a high availability (HA) deployment and a persistent configuration store for the WAN acceleration appliance 600.

WCCP service module 615 may implement WCCP service for routers, switches, gateways and the like to accelerate WCCP conveyed traffic across a WAN.

Data cache synchronization module 625 may implement data cache synchronization service among multiple WAN accelerator appliances to facilitate, among other things, pre-population (e.g., software patches), synchronization for disk redundancy and HA and recovery for out-of-sync data reference.

According to one embodiment, traffic processing subsystem 620 intercepts network traffic, classifies packets to apply appropriate security policies and WAN acceleration techniques as well as implement security protections, such as anti-virus scanning, spam detection, and Web filtering, in order to deliver them faster and more securely from sender to receiver. Traffic processing subsystem 620 also recovers the data stream and decodes application protocol, and then reduces bandwidth usage and delivery latency through data reduction, compression, and/or other WAN acceleration techniques using a tunnel protocol at the sender side. On the receiver side, traffic processing subsystem 620 translates tunneled traffic by decompressing and recovering the equivalent data stream before forwarding it to the intended destination.

Data compression libraries 635 represent the compression algorithms implemented by the WAN acceleration appliance 600 and its peers. Examples of various compression/decompression techniques are described further below.

In one embodiment, data cache subsystem 630 implements disk-based data chunk storage services to store data entries indicative of relationships among data chunks and data references. Data cache subsystem 630 also may provide efficient ways to add, lookup, delete and update data entries to other subsystems, such as traffic processing subsystem 620. In some implementations, data cache subsystem 630, accepts service requests and notifies the requestor asynchronously in order to archive better performance. Data cache subsystem 630 may also implement an efficient way to replace obsolete data entries with new entries.

In one embodiment, the functionality of one or more of the above-referenced functional units may be merged in various combinations. For example, data cache synchronization module 625 and data cache subsystem 630 may be combined. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.).

According to embodiments of the invention, the functional units can be any suitable type of logic (e.g., digital logic) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 7:
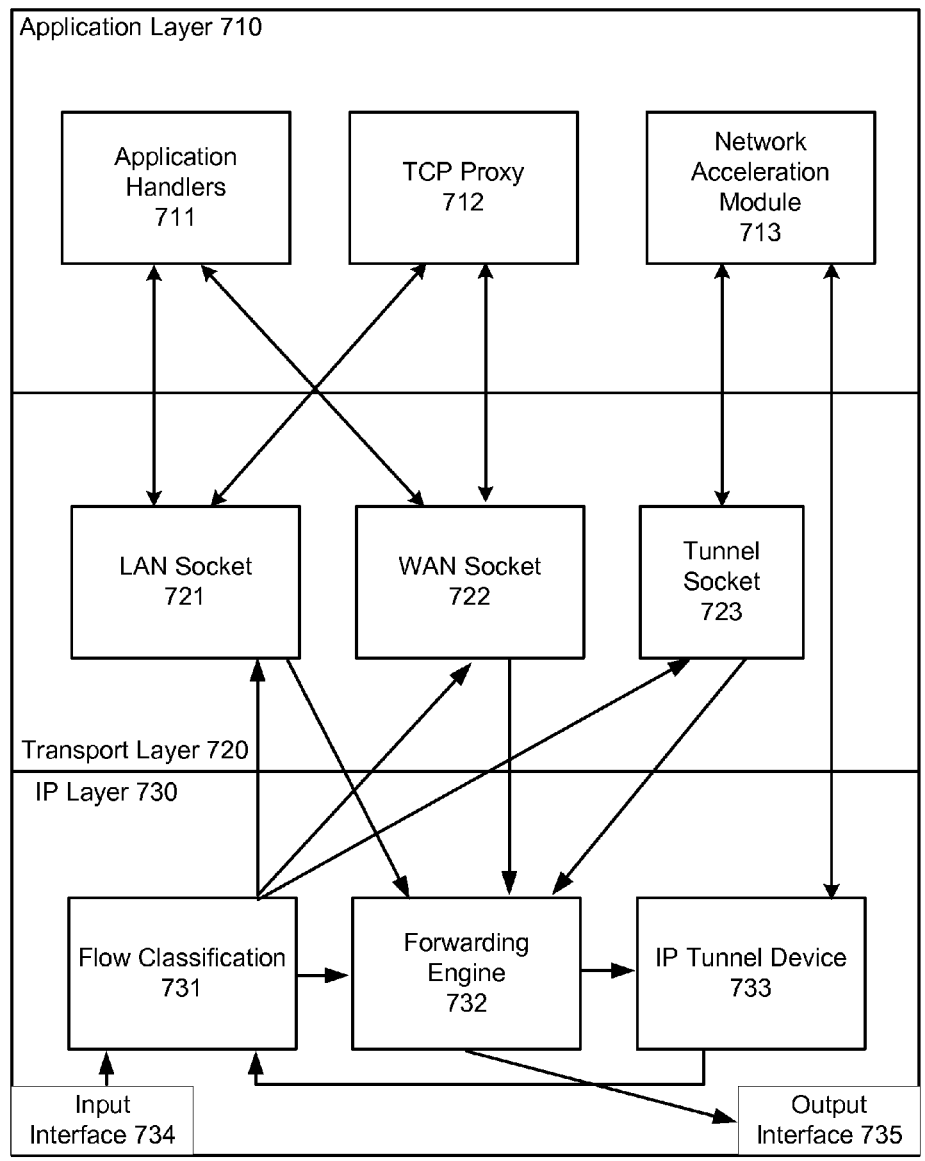
FIG. 7 is a block diagram conceptually illustrating how packets are processed at various protocol layers in accordance with one embodiment of the present invention.

FIG. 7 is a block diagram conceptually illustrating how packets are processed at various protocol layers in accordance with one embodiment of the present invention. In the present example, various modules, subsystems and/or functionalities are discussed from a traffic flow view in an IP layer 730, a transport layer 720 and an application layer 710 in order to provide yet another perspective and facilitate understanding of embodiments of the present invention.

IP layer 730 includes an input interface 734, an output interface 735, a flow classification module 731, a forwarding engine 732 and an IP tunnel device 733. Transport layer 720 includes a LAN socket 721, a WAN socket 722 and a tunnel socket 723. Application layer 730 includes application handlers 711, a generic TCP proxy 721 and a network acceleration module 713.

Packets to be processed by the WAN acceleration appliance are received on the input interface 734 and after having been processed are transmitted via the output interface 735. Notably, the input interface 734 and the output interface may be one in the same.

According to one embodiment, flow classification module 713 is responsible for mapping incoming packets to an appropriate flow. Each flow of packets includes a sibling flow of response packets that flows in the opposite direction. These two flows are called the forward path and the reverse path. Whichever direction initiates the connection is called the forward path. The state information for these two flows is stored in a session context that is shared by the forward and reverse paths. When a packet doesn't match an existing flow, it is classified into a new session context based on one or more characteristics, including, but not limited to, source address, destination address and/or applications, and matched against a list of policies to obtain appropriate service processing actions.

Flow classification module 731 may receive (i) packets originated by a local client/server, (ii) packets originated by a remote client/server (corresponding to a connection-oriented traffic flow) (iii) compressed and coalesced packets (yet to be processed by the network acceleration module 713) corresponding to packets originated by a remote client/server and (iv) packets originated by a remote client/server (corresponding to a connectionless traffic flow that is not being optimized, or corresponding to a traffic flow that is being optimized, but after having been processed by the network acceleration module 713). In case (i), flow classification module 731 will pass the packets to the transport layer 720 via the LAN socket 721. In case (ii), flow classification module 731 passes the packets to the transport layer 720 via the WAN socket 722. In case (iii), flow classification module 731 passes the packets to the transport layer 720 via tunnel socket 723. In case (iv), flow classification module 731 passes the packets to the forwarding engine 732.

Forwarding engine 732 performs QoS and traffic shaping, packet forwarding and redirection of packets to the IP tunnel device 733.

According to one embodiment, IP tunnel device 735 is a virtual device adapted to bring traffic that has been identified as a candidate for network acceleration up to the application layer 710 for processing as described further below by a network acceleration module 713 in the application layer 710. In relation to connectionless protocol traffic intended for transmission over WAN to a peer WAN acceleration appliance, IP tunnel device 733 queues packets that are candidates for optimization for processing by the network acceleration module 713. In relation to connectionless protocol traffic received from a peer WAN acceleration appliance, IP tunnel device 733 redirects packets already processed by the network acceleration module 713 to the flow classification module 713 for appropriate processing.

Turning now to the transport layer 720, LAN socket 721 represents an interface between an application process or thread executing within a client (e.g., client 120) or a server (e.g., server 130) and the TCP/IP protocol stack provided by the operating system of the WAN acceleration appliance (e.g., WAN acceleration appliance 115A, 115B).

WAN socket 722 represents an interface between peer WAN acceleration appliances (e.g., WAN acceleration appliances 115A and 115B) for connection-oriented traffic. In one embodiment, WAN socket 722 performs window scaling, round-trip measurement, selective ACK and high speed TCP.

Tunnel socket 723 represents an interface between peer WAN acceleration appliances (e.g., WAN acceleration appliances 115A and 115B) for connectionless traffic.

Turning now to the application layer 710, in one embodiment, application handlers 711 includes an application handler for performing protocol specific acceleration for each of the application protocols desired to be accelerated. Exemplary application protocol targets for optimization/acceleration include, but are not limited to, (i) web applications (e.g., Hypertext Transport Protocol (HTTP) and HTTP over Secure Socket Layer (HTTPS), Web2.0/Ajax), (ii) windows file sharing (e.g., Common Internet File System (CIFS), Server Message Block (SMB) and the like), (iii) Microsoft Exchange (e.g., Messaging Application Programming Interface (MAPI)), (iv) File Transfer Protocol (FTP), (v) Simple Mail Transfer Protocol (SMTP), Post Office Protocol (POP), Internet Message Access Protocol (IMAP), (vi) databases (e.g., Microsoft Structured Query Language (MS-SQL), Oracle SQL and the like), (vii) data replication (e.g., SnapMirror, NetBackup, MS Backup) and (viii) Enterprise Resource Planning (ERP)/Customer Relationship Management (CRM) (e.g., Lotus Notes). In one embodiment, according to an application security integration model, various security functions, such as anti-virus scanning, spam detection, web filtering and the like, can be implemented within application handlers 711.

In one embodiment, each of the application handlers 711 handles a particular application protocol and performs desired protocol optimizations. In relation to application protocol traffic to be transmitted over the WAN to a peer WAN acceleration appliance, application handlers 711 may also apply data reduction and data compression to convert data originated by the corresponding application protocol into encoded data blocks which are then forwarded to WAN socket 722 for transmission over the WAN. In relation to application protocol traffic received over the WAN from a peer WAN acceleration appliance, application handlers 711 apply data de-duplication and data decompression to recover the original data from the encoded data blocks received from the WAN socket 722. According to one embodiment, the application handlers 711 also perform TCP connection pooling on the WAN side.

According to one embodiment each application handler is able to process traffic from sockets and WCCP. Such traffic processing typically involves intensive database accessing and processor heavy operations, such as hashing and data compression. Various implementations may take advantage of multiple processors by using shared memory and multiple processes. Alternatively, multithreading may be used to facilitate hashing and/or data compression being performed by each application handler.

In various embodiments, in relation to data intended for transmission over the WAN, generic TCP proxy 712 applies data reduction and data compression to convert original data into encoded data blocks which are forwarded to the WAN socket 722. With respect to data received over the WAN via WAN socket 722, generic TCP proxy 712 applies data de-duplication and data decompression to recover the original data from encoded data blocks received by the WAN socket 722. According to one embodiment, generic TCP proxy 712 also performs TCP connection pooling on the WAN side.

Generic TCP proxy 712 may also take into consideration the design and implementation goals referenced above with referenced to application handlers 711. Additionally, generic TCP proxy 712 can read data aggressively, but in one embodiment, it shall not wait for more data for each TCP connection in order to avoid negatively impacting user experience in relation to interactive protocols.

Network acceleration module 713 may perform data reduction, header and data compression and/or packet coalescing. According to one embodiment, in relation to packets intended for transmission over the WAN to a peer WAN acceleration appliance, network acceleration module 713 receives packets from IP tunnel device 733, performs data reduction and data compression to convert the original packet data into encoded data blocks and applies header compression to packet headers. In one embodiment, network acceleration module 713 also combines multiple compressed packets into one packet and sends the compressed and coalesced packet through the tunnel socket 723. According to one embodiment, in relation to packets received over the WAN from a peer WAN acceleration appliance via the tunnel socket 723, network acceleration module 713 converts each received packet received from the tunnel socket 723 into multiple packets. Then, for each packet, network acceleration module 713 decompresses the header, applies data de-duplication and data decompression to recover the original packet. Finally, network acceleration module 713 writes the recovered original packets and writes them to IP tunnel device 733 for redirection.

Figure 8:
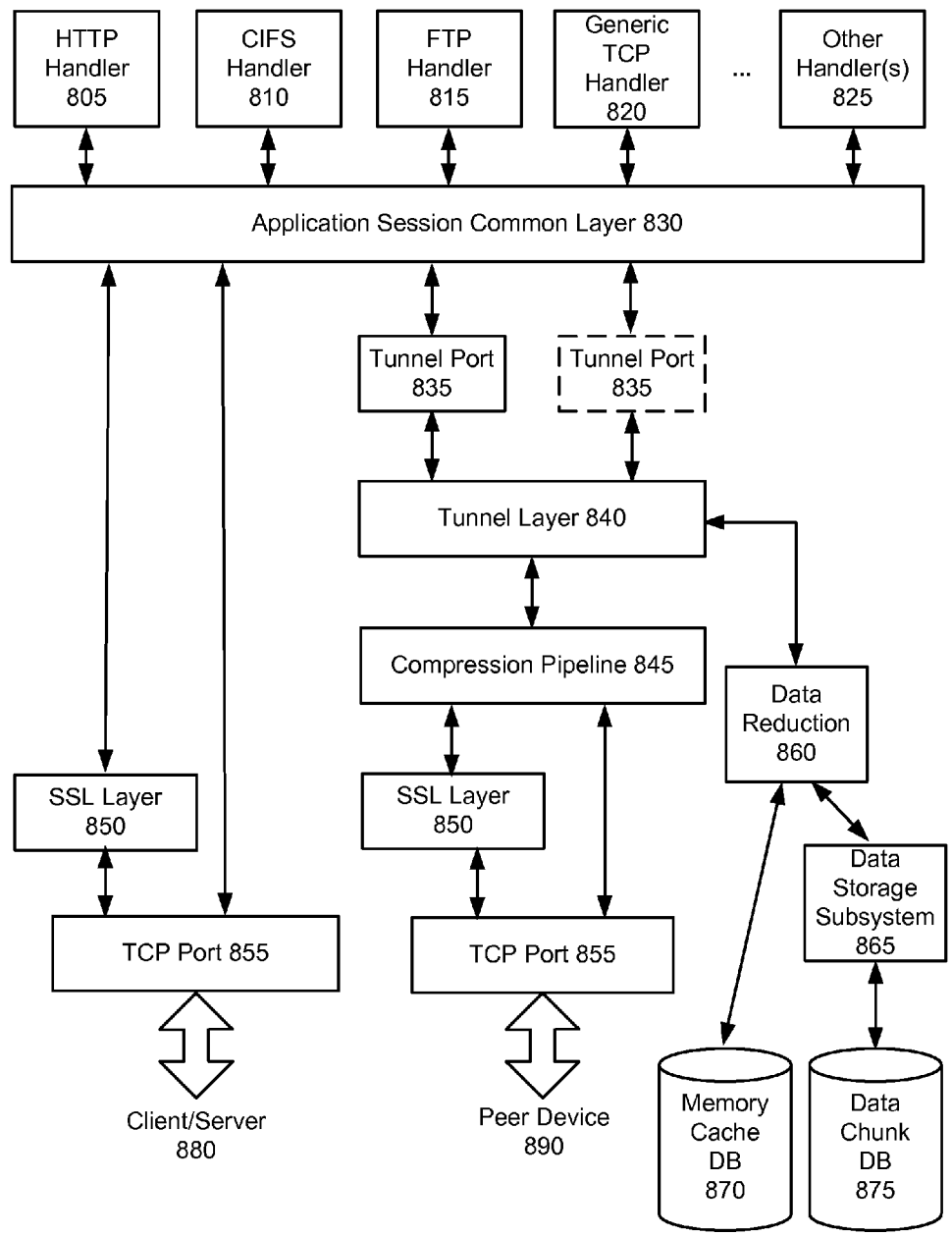
FIG. 8 is a block diagram conceptually illustrating a proxy framework for traffic processing to achieve WAN optimization in accordance with one embodiment of the present invention.

FIG. 8 is a block diagram conceptually illustrating a proxy framework for traffic processing to achieve WAN optimization in accordance with one embodiment of the present invention. According to the present example, application handlers, including but not limited to an HTTP handler 805, a CIFS handler 810, an FTP handler 815 and a generic TCP handler 820 interface with an application session common layer 830. Clients/servers 880 and a peer device 890 (e.g., WAN acceleration appliance 115B) interface with WAN acceleration appliance (e.g., WAN acceleration appliance 115A) via a TCP port 855. Application session common layer 830 hides session setup/teardown processing from the application handlers 805, 810, 815, 820 and 825. Each of the application handlers 805, 810, 815, 820 and 825 may implement specific processing, such as parsing the corresponding protocol to identify and label data objects, transforming data (e.g., data compression), manipulating the transmission to streamline transmission of data objects in order to reduce "chatty" effects.

According to one embodiment, TCP port 855 implements general TCP socket event processing including read/write as well. Both application connections and the TCP tunnel may use the same TCP port 855.

In one embodiment, TCP port 855 makes use of an SSL layer 850 to support secured tunnels between peer devices. The peer devices can authenticate each other using either a pre-shared secret key or digital certificates. Once the peer devices have successfully authenticated each other, a secure channel can be established between the peer devices.

SSL layer 850 may also be used to accelerate SSL secured applications. According to one embodiment, SSL acceleration differs from existing approaches in one or more of the following ways: (i) the negotiated session key is passed back to the client-side device using a secured channel built inside the same tunnel already established between two peers across the WAN, thereby eliminating the need for an additional connection, (ii) two authentication methods are supported to authenticate peers (e.g., pre-shared secret key or digital certificate), (iii) tunnel traffic can be protected by SSL or by other means, including, but not limited to an Internet Protocol Security (IPSec) tunnel, depending upon configuration of the WAN acceleration appliance and (iv) traffic from the server-side device to the origin server can be configured to be plain text in SSL half mode (server SSL offloading).

Application session common layer 830 connects the application handlers to the peer device 890 via tunnel ports 835, a tunnel layer 840, a compression pipeline 845, the SSL layer 850 and TCP port 855. Tunnel ports 835 implement the data stream between an application sessions and a TCP tunnel. As described above, in one embodiment, multiple tunnel ports 835 may share the same TCP tunnel. According to one embodiment a tunnel port ID is used to multiplex and de-multiplex data from the tunnel.

Tunnel layer 840 implements a tunnel protocol to setup/teardown sessions through the tunnel, authenticate tunnel endpoints and synchronize data/memory cache for data reduction performed by a data reduction module 860. In one embodiment, both data and control events for an application session are exchanged through the tunnel protocol.

According to one embodiment, both connection-oriented and connectionless tunnels are established by peer WAN acceleration appliances. In one embodiment, two different modes (e.g., automatic mode and on-demand mode) of tunnel establishment are supported. In automatic mode, the peer devices recognize each other as peers and proceed to establish both connection-oriented and connectionless tunnels when there is no tunnel between them. The peer device, then proceed to keep the tunnels alive. In on-demand mode, tunnel establishment is delayed until a client sends a traffic stream to the server that needs to be tunneled in order to be accelerated.

According to one embodiment, when a client initiates a data communication session to a server through the WAN, it becomes network packets intercepted by a traffic acceleration device located at the edge between WAN and LAN. The traffic acceleration device identifies particular data packets associated with the communication session by matching their packet header fields, source address, destination address, source port, destination port and protocol, with a data stream. Typically, a data stream from a client to a server and its reverse data stream from the server to client are combined as a unique communication session. When the device at the client side intercepts a communication session, it assigns a unique session ID to it, which is used to label data belonging to the communication session before the data is injected into a tunnel that is built either in automatic mode or on-demand mode. Hence, multiple data communication sessions may share the same tunnel between two traffic acceleration devices. When a traffic acceleration device intercepts a data communication initiation, it conveys the session association between session ID and packet header fields to the peer device through the tunnel. The peer device will then setup the session association in its memory. For connection-oriented data communication session at the peer device, setup session association involves making a connection to the server using either its own address or the client address as source address.

Once the data communication session association is set up at both devices, associated data streams may be handled by either an application handler or a network handler. The selection of handler may be done by matching the data communication session with a set of predefined acceleration policies. At the sender side, the role of an application handler is to convert data packets into application data through sockets and to classify and tag the data stream into different data transformation stages so that different data reduction techniques can be used to accelerate the data stream through a connection oriented tunnel. At the receiver side, the role of an application handler is to convert the application data steam from the tunnel into data packets through the socket so that the receiver receives the original data from the sender without awareness of the traffic acceleration devices. An application handler may also manipulate the data stream to fetch data faster from the data sender to improve overall data transmission speed. The role of the network handler (e.g., network acceleration module 713) is to reduce both the number of bytes in raw data packets and the number of raw data packets by using packet header compression and packet coalescing to combine multiple user packets travelling between the same two sites (e.g., LAN segments) into a single coalesced packet and hence reduce the latency for those packets before the data packets are injected into a connectionless tunnel at the sender side. At the receiver side, the role of the network handler is to recover user packets from a single coalesced packet and decompress their header before forwarding to the receiver.

As indicated above, one or more TCP tunnels may be used by embodiments of the present invention to improve the performance of TCP across high latency (and loss) links by employing various techniques, including, but not limited to, TCP window scaling, selective acknowledgement (SACK), round-trip measurement and High-Speed TCP. In one embodiment, a TCP tunnel is shared among a group of data communication sessions to minimize session setup and system resource overhead for the data communication sessions and to improve the data compression rate in the compression pipeline 845. In some embodiments, private TCP tunnels may be used for data communication sessions if the quality of the user-interactive experience may otherwise be lowered by use of a shared TCP tunnel. A predetermined or configurable list of interactive protocols known or observed to introduce increased latency for a specific event in TCP data in the context of a shared TCP tunnel may be consulted to make this determination.

The data reduction module 860 implements data reduction techniques to convert a labeled data stream to references or recover references back to the original data stream. In one embodiment, to maintain high performance, Inter-Process Communication (IPC) may be used by the data reduction module 860 to interface with the data storage subsystem 865, which stores data reduction databases, e.g., data chunk DB 875, in disk storage. According to one embodiment data storage subsystem 865 implements terabyte storage and disk redundancy based on Linux RAID. Alternatively, a failover mode may be used in place of a RAID solution. Depending upon the target market, a low-end solution may use a pair of disks to backup each other with a health watchdog to monitor disk failure. In an exemplary higher-end solution, multiple hard disks may be combined into a single logical unit with terabyte storage and hot swappable disk support. In either case, intelligent caching algorithms are used to obsolete data blocks to leave room for new data blocks.

Compression pipeline 845 performs compression/decompression on the data stream of the TCP tunnel using one or more of the compression/decompression techniques described further below.

Figure 9:
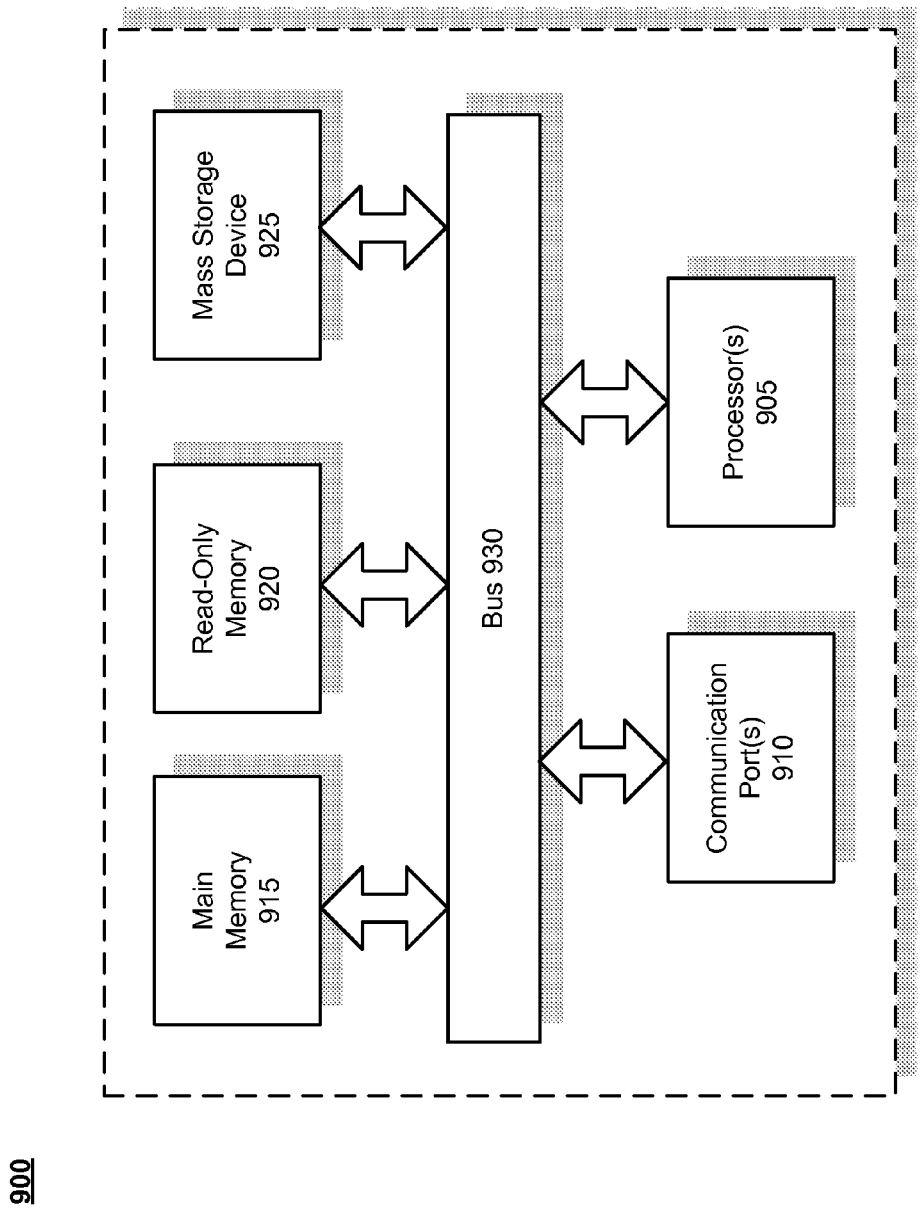
FIG. 9 is an example of a computer system with which embodiments of the present invention may be utilized.

FIG. 9 is an example of a computer system with which embodiments of the present invention may be utilized. The computer system 700 may represent or form a part of a network security platform, network gateway, firewall, network appliance, switch, bridge, router, server, client workstation, standalone WAN acceleration appliance and/or other network device implementing one or more of the functional units depicted in FIGS. 6-8. According to FIG. 9, the computer system 900 includes one or more processors 905, one or more communication ports 910, main memory 915, read only memory 920, mass storage 925 and a bus 930.

The processor(s) 905 may be Intel® Itanium® or Itanium 2® processor(s), AMD® Opteron® or Athlon MP® processor(s) or other processors known in the art.

Communication port(s) 910 represent physical and/or logical ports. For example communication port(s) may be any of an RS-232 port for use with a modem based dialup connection, a 10/100 Ethernet port, or a Gigabit port using copper or fiber. Communication port(s) 910 may be chosen depending on a network such a Local Area Network (LAN), Wide Area Network (WAN), or any network to which the computer system 900 connects.

Communication port(s) 910 may also be the name of the end of a logical connection (e.g., a Transmission Control Protocol (TCP) port or a Universal Datagram Protocol (UDP) port). For example communication ports may be one of the Well Know Ports, such as TCP port 25 (used for Simple Mail Transfer Protocol (SMTP)) and TCP port 80 (used for HTTP service), assigned by the Internet Assigned Numbers Authority (IANA) for specific uses.

Main memory 915 may be Random Access Memory (RAM), or any other dynamic storage device(s) commonly known in the art.

Read only memory 920 may be any static storage device(s) such as Programmable Read Only Memory (PROM) chips for storing static information such as instructions for processors 905.

Mass storage 925 may be used to store information and instructions. For example, hard disks such as the Adaptec® family of SCSI drives, an optical disc, an array of disks such as RAID, such as the Adaptec family of RAID drives, or any other mass storage devices may be used.

Bus 930 communicatively couples processor(s) 905 with the other memory, storage and communication blocks. Bus 930 may be a PCI/PCI-X or SCSI based system bus depending on the storage devices used.

Optionally, in the case of a server and typically in the case of a fixed client device, such as a desktop computer, operator and administrative interfaces (not shown), including, but not limited to, a display, keyboard, and a cursor control device, may also be coupled to bus 930 to support direct operator interaction with computer system 900. Other operator and administrative interfaces can be provided through network connections connected through communication ports 910.

Depending upon the particular implementation and the role of the computer system 900, optional removable storage media (not show) may also be provided and may be any kind of external hard-drives, floppy drives, IOMEGA® Zip Drives, Compact Disc-Read Only Memory (CD-ROM), Compact Disc-Re-Writable (CD-RW), Digital Video Disk (DVD)-Read Only Memory (DVD-ROM), Re-Writable DVD and the like.

Figure 10:
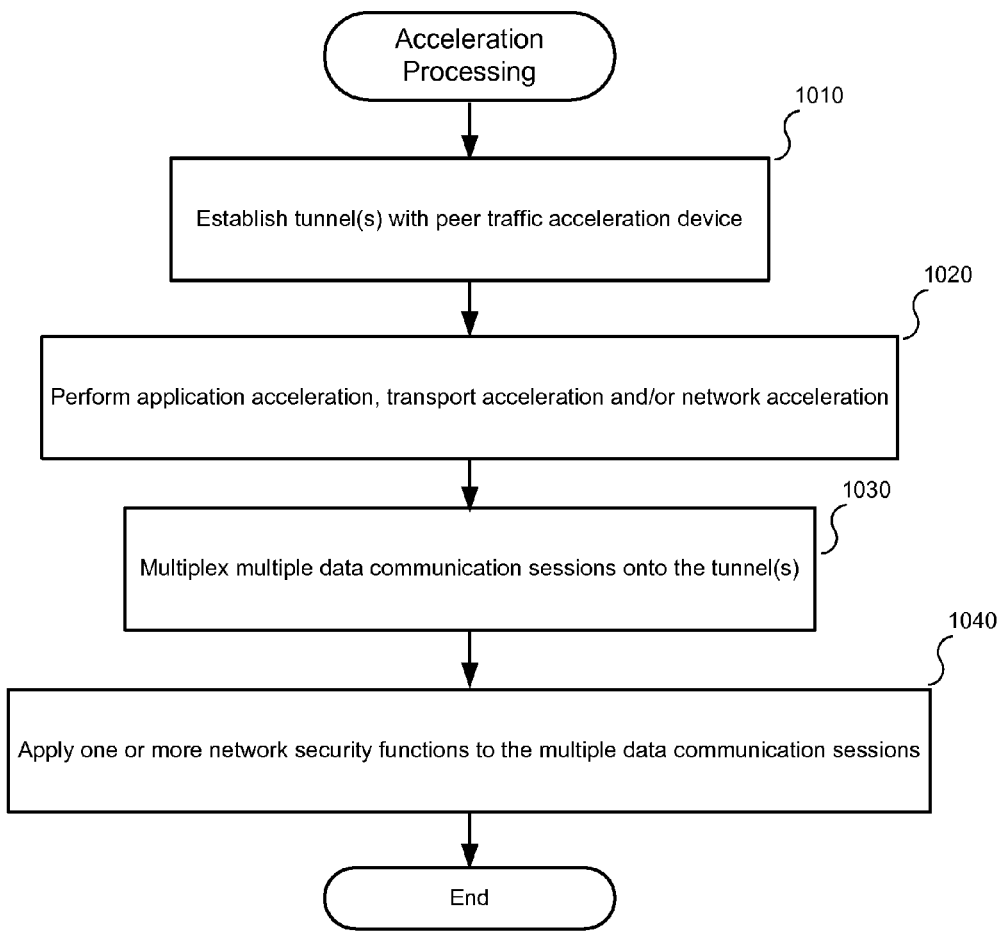
FIG. 10 is a flow diagram illustrating acceleration processing in accordance with an embodiment of the present invention.

FIG. 10 is a flow diagram illustrating acceleration processing in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 1010, peer traffic acceleration devices (e.g., WAN acceleration appliances 115A and 115B) establish one or more tunnels with each other. According to one embodiment, a shared connection-oriented tunnel may be established and a shared connectionless tunnel may be established. Tunnel establishment may be automatic upon the peers detecting one another or it may be on-demand responsive to traffic that would benefit from the existence of a tunnel being received at one of the peer traffic acceleration devices.

At block 1020, one or more acceleration/optimization approaches are applied to traffic transmitted between the peer acceleration devices. According to one embodiment, a policy engine within the peer acceleration devices makes the determination regarding how to accelerate traffic over the WAN. In one embodiment, three different kinds of traffic optimizations can be performed over the WAN, application acceleration, transport acceleration and network acceleration. Depending upon the particular implementation, one or more of these traffic optimizations may be employed.

As described above, in one embodiment, application acceleration may be implemented by a series of application proxies/handlers for poorly behaved WAN protocols, for example. In one embodiment, the application proxies are adapted to identify relatively stable data blocks, such as files, images, web pages and the like, while being aware of interactive state so that they can do a better job by applying proper data reduction, data compression and Quality of Service (QoS) for different protocol data.

As described above, in one embodiment, transport acceleration improves the performance of transport protocols (e.g., TCP) across high latency and high loss links by implementing one or more of TCP connection pooling, TCP window scaling, selective acknowledgements, Round-Trip Measurement and High-Speed TCP.

As described above, in one embodiment, network acceleration may involve reducing bandwidth usage over the WAN and improving WAN performance at the packet level by using data reduction, data compression, packet coalescing and the like. QoS and traffic shaping may also be performed.

At block 1030, multiple data communication sessions traversing the traffic acceleration device and intended for transmission across the WAN are multiplexed onto the tunnels established in block 1010.

At block 1040, one or more security functions are applied to the multiple data communication sessions by the sending and/or the receiving traffic acceleration device. As described above, in some embodiments, one or both of the peer traffic acceleration devices are integrated within a secure gateway, network security platform and/or a security agent, such as an end point security solution, running within the same computer system as the application client, which performs various security functions, including, but not limited to antivirus scanning, spam detection, web filtering, firewalling, intrusion detection and prevention and virtual private network (VPN) services.

It should be noted, in view of the potentially limitless variations and combinations, the above-described flow diagram is merely exemplary, and that one of ordinary skill in the art will recognize a variety of alternative and/or additional permutations of the processing flow that may be utilized in relation to different embodiments of the present invention.

Various data reduction and data compression techniques that may be employed by embodiments of the present invention are now described. Data reduction takes advantage of a frequently occurring situation, namely that the recipient device already has a copy of data or a file that is the same or similar to the one be transmitted.

According to one embodiment, both the sender (e.g., server 130) and the recipient (e.g., client 120) have a database of data chunks (e.g., data chunk DB 875) that has been learned from previous data transmissions. Conceptually, data deduction works as follows:

1) The sender cuts a copy of data or a file into chunks and computes a hash value for each chunk. Various appropriate hashing algorithms are well known. Examples of good candidates include, but are not limited to, Message Digest algorithm 5 (MD5) and the secure hash algorithm (SHA).
2) The sender may compute a super level hash value based on a group of hash values at a lower level to gain further data reduction.
3) The sender sends the recipient the hash values along with the level and length information.
4) The recipient compares those hash values with the ones it has learned and stored in its local database. When two hash values are the same, the recipient assumes that the corresponding chunks are the same.
5) The recipient tells the sender which of the chunks are not the same, hence which chunks the recipient cannot deduce based on the hash value.
6) The sender sends those chunks to the recipient.
7) For super level hash values, steps 4-6 may be applied recursively until the original data or file is recovered by the recipient.

In order to reduce data transmission efficiently, a reasonably effective data chunking algorithm is very important. The chunks should not be too short. The main reason is that the efficiency depends on sending hash values that are significantly shorter than the chunks they represent. The hash values also should not be so short that accidental hash conflicts lead the recipient to mistakenly conclude that it already has a chunk when it does not. There are other disadvantages with short chunks. For each chunk, strong checksums typically have to be created. Although, this step is only required once, it requires a reasonable amount of computing overhead. The shorter the chunks, the more chunks that are present in the data chunk DB 875 and the more overhead that is required to compute checksums. There is also significant time overhead involved in storing and searching data hashes in the database.

On the other hand, the chunks should not be too long. With excessively long chunks, the chance to find the same data chunk in the database is very low. A good chunking algorithm should chop similar data into chunks at corresponding locations so that similarity can be detected by chunks having the same hash values.

According to one embodiment, fixed size data chunking is used. Fixed size data chunking chops a copy of data into fixed size data chunks. Fixed size data blocks are simpler than content-based data blocks and also provide more efficient storage implementation. However, a single character added to the data can make the chunks entirely different.

In other embodiments, content dependent data chunking is employed. A content-dependent data chunking algorithm uses a block indication method to consume each bit or byte of data and then decides if it finds a boundary of a data block. The length of the outputted data chunk may be at wild ranges and be determined by some internal features of the data itself, which obviously makes fetching and storing it into data storage less efficient than fixed size data blocks.

A good content-dependent data chunking algorithm may be more adaptive to data changes. However, a bad content-dependent data chunking algorithm will be certainly worse than a fixed size data chunking algorithm.

As mentioned above, an application handler classifies and tags data streams into different stages so that different data reduction techniques can be used to accelerate transmission through a connection-oriented tunnel.

According to one embodiment, there are three kinds of recognized stages: unlikely repeatable data, repeatable but not stable data, and stable data. For stable data, a hierarchical data reference reduction algorithm and a variable length data reference reduction algorithm may be used to reduce data by replacing the original data with much shorter data references on the device at the sender before forwarding it to the device at receiver side while the device at receiver side recovers the original data before forwarding it to the receiver. Both hierarchical data reference reduction algorithms and variable length data reference reduction algorithms use disk-based data storage to hold data references and data blocks.

For repeatable but not stable data, a memory based data reference reduction algorithm may be used. For unlikely repeatable data, the system may simply forward the data as is.

All these data reference algorithms try to replace fixed or variable length data blocks with shorter length data references at the sender side of a tunnel. Then the data references are forwarded to the receiver side of the tunnel and the receiver side recovers the data references with original data by looking up the data references on either disk-based or memory based data storage to find the corresponding data blocks. In one embodiment, the tunnel also provides a method to request missing data references from the receiver side and send back responses with both data references and data blocks from the sender side.

In one embodiment, regardless of whether a data block is forwarded through a tunnel as a data reference or in raw form for a specific session, the data is tagged with its session ID at the sender side. Hence, this is why the communication channel between the two traffic acceleration devices is called a "tunnel". At the receiver side, the data reference or raw data is first de-multiplexed to find its session context and then is processed in the appropriate session context.

Turning now to hierarchical data referenced reduction, at the sender side, an application handler may tag data stream as stable data, e.g., file or image data identified by the application handler, and inject data into the tunnel transformer. First, the tunnel transformer divides the data stream into data chunks, e.g., 2 K byte data blocks, using a data chunking algorithm, such as one of those mentioned above. Then, a hash function computes a data reference for each data block as a result of hashing. A good hash function is one which generates different data references for data blocks with different content in most of the cases and it is rare that data blocks with different content share the same data reference. Hence, a stream of stable data may be converted into many contiguous data references and a remainder data block with a variable length less than the block size. In turn, the system tries to lookup each data reference and its related data block in disk-based data storage. If no entry exists, the data reference and its related data block are stored together into disk based data storage.

In one embodiment, a fixed number of contiguous data references can be combined as data to compute a level-1 super reference using a similar hash function. Recursively, the level-i+1 super reference can be computed using a fixed number of contiguous level-i super references as data. In this manner, a super level can refer to a large block of data, which results in a high compression rate, while a data reference can refer to a small block of data for better granularity. In various embodiments of the present invention, the number of the reference level can be limited by a predetermined or configurable maximum number, the tempo of data communication or the data itself.

Turning now to a discussion regarding variable length data reference reduction, it is to be understood that stable data is not always aligned at data chunk boundaries. Therefore, the above hierarchical data reference reduction approach works well for the aligned data blocks of a stable data stream, but not the remainder data block, which is typically variable in length. Also, data inside a single packet is both limited and variable in size. A variable length data reference reduction technique works better for both cases.

According to one embodiment, the algorithm to generate data references for variable length data blocks is slightly difference from the fixed size data block approach described above. The same or different hash function may be used to generate hash values. And, the hash value combined with length becomes a data reference for the variable length data block. The data reference replaces the original data block before it is forwarded through the tunnel at the sender side. In turn, the system tries to lookup the data reference and its related data block in disk-based data storage. If no entry exists, the data reference and its related data block are stored together into disk based data storage.

Turning now to a discussion of memory based data reference reduction, this approach is typically used to reduce data traffic in relation to repeatable, but not stable data, e.g., voice data of a Webex conference that may be sent to multiple receivers in the same subnet.

The algorithm to generate data references can be the same as the above variable length data reference reduction approach. The data reference is then used to lookup a cache entry in a hash indexed cache table in memory (e.g., memory cache DB 870). The data reference will only replace the original data block if same data content is already in the memory cache. If it is not in memory cache yet, the data reference and its data block is cached in a hash indexed table in memory.

Turning now to a discussion regarding data compression, according to one embodiment, WAN accelerator appliances employ only lossless data compression algorithms. Most types of compression work in a similar way. In essence, the sender's end shrinks data by substituting a type of shorthand for common sequences, and the receiver's end interprets the shorthand to restore the original content. Many compression algorithms involve spotting repeated sequences in the data and making predictions about what comes next. A compression dictionary is the location where an algorithm stores its data sequences, predictions, shortened substitutions, and/or any other data it needs to do its job.

Both the sending (compressing) and receiving (decompressing) units use the same compression algorithm for the same traffic and keep each other posted on the contents of associated compression dictionaries.

In some embodiments, the WAN accelerator appliances support a variety of compression algorithm options. Sometimes, applications benefit from one compression algorithm more than from another. In one embodiment, all classes of applications use a default algorithm and dictionary size and services use predefined settings appropriate for the traffic type. In other embodiments, some classes and services use the default algorithm and dictionary size and one or more classes/services may have their own private compressors.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A computer-implemented method comprising:
    establishing both a shared connection-oriented tunnel and a shared connectionless tunnel between a first wide area network (WAN) acceleration device and a second WAN acceleration device, the shared connection-oriented tunnel operable to convey connection-oriented traffic flow, but not connectionless traffic flow, between the first WAN acceleration device and the second WAN acceleration device and the shared connectionless tunnel operable to convey connectionless traffic flow, but not connection-oriented traffic flow, between the first WAN acceleration device and the second WAN acceleration device, the first WAN acceleration device interposed between a public network and a first local area network (LAN) and the second WAN acceleration device interposed between a second LAN and the public network; and securely accelerating network traffic exchanged between the first LAN and the second LAN by (i) multiplexing a plurality of data communication sessions between the first LAN and the second LAN onto the shared connection-oriented tunnel and the shared connectionless tunnel, (ii) performing application acceleration on one or more connection-oriented traffic flows of the plurality of data communication sessions and performing one or more of transport acceleration and network acceleration on the one or more connection-oriented traffic flows and on one or more connectionless traffic flows of the plurality of data communication sessions and (iii) performing one or more security functions on the one or more connection-oriented traffic flows.

2. The method of claim 1, wherein the first WAN acceleration device comprises a logical device running within a client system on the first LAN.

3. The method of claim 1, wherein the second WAN acceleration device comprises a logical device running within a client system on the second LAN.

4. The method of claim 1, further comprising establishing one or more private tunnels between the first WAN acceleration device and the second WAN acceleration device and using the one or more private tunnels for a data communication session of the plurality of data communication session when use of the shared connection-oriented tunnel or the shared connectionless tunnel would otherwise negatively impact user-interactive experience.

5. The method of claim 1, wherein said establishing both a shared connection-oriented tunnel and a shared connectionless tunnel between a first wide area network (WAN) acceleration device and a second WAN acceleration device comprises automatically establishing the shared connection-oriented tunnel and the shared connectionless tunnel responsive to either the first WAN acceleration device or the second WAN acceleration device recognizing the other as a peer WAN acceleration device.

6. The method of claim 1, wherein said establishing both a shared connection-oriented tunnel and a shared connectionless tunnel between a first wide area network (WAN) acceleration device and a second WAN acceleration device comprises establishing the shared connection-oriented tunnel and the shared connectionless tunnel after determining that one or more of the plurality of data communication sessions would benefit as a result.

7. The method of claim 1, wherein said application acceleration is performed at an application layer of a protocol stack implemented within the first WAN acceleration device and the second WAN acceleration device.

8. The method of claim 1, wherein said transport acceleration comprises techniques used to improve performance of Transport Control Protocol (TCP) across high latency or high loss links including one or more of TCP connection pooling, TCP window scaling, selective acknowledgement (SACK), round-trip measurement and HighSpeed TCP.

9. The method of claim 1, wherein said network acceleration comprises packet-level bandwidth reduction techniques including one or more of data reduction, data compression and packet coalescing.

10. The method of claim 1, wherein the one or more security functions include one or more of antivirus scanning, web filtering, spam detection, firewalling and intrusion prevention.

11. A program storage device readable by one or more processors of a network device, tangibly embodying a program of instructions executable by the one or more processors to perform method steps for securely accelerating wide area network (WAN) traffic, said method steps comprising:
    establishing both a shared connection-oriented tunnel and a shared connectionless tunnel between the network device and a peer WAN acceleration device through a WAN coupling the network device and the peer WAN acceleration device in communication the shared connection-oriented tunnel dedicated to transmission of connection-oriented traffic flow between the network device and the peer WAN acceleration device and the shared connectionless tunnel dedicated to transmission of connectionless traffic flow between the network device and the peer WAN acceleration device; and
    securely accelerating network traffic exchanged between the network device and the peer WAN device by (i) multiplexing a plurality of data communication sessions between the network device and the peer WAN device onto the shared connection-oriented tunnel and the shared connectionless tunnel, (ii) performing application acceleration on one or more connection-oriented traffic flows of the plurality of data communication sessions and performing one or more of transport acceleration and network acceleration on the one or more connection-oriented traffic flows and on one or more connectionless traffic flows of the plurality of data communication sessions and (iii) performing one or more security functions on the one or more connection-oriented traffic flows.

12. The program storage device of claim 11, wherein the network device comprises a client system.

13. The program storage device of claim 11, wherein the network device comprises a network security appliance.

14. The program storage device of claim 11, wherein the network device comprises a gateway.

* * * * *